United States Patent
Chandrasekhar et al.

(12) United States Patent (10) Patent No.: US 12,003,994 B2
(45) Date of Patent: *Jun. 4, 2024

(54) CSI REPORTING

(71) Applicant: Texas Instruments Incorporated, Dallas, TX (US)

(72) Inventors: Vikram Chandrasekhar, Mountain View, CA (US); Runhua Chen, Plano, TX (US); Anthony Edet Ekpenyong, San Diego, CA (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/306,774

(22) Filed: May 3, 2021

(65) Prior Publication Data

US 2021/0258814 A1     Aug. 19, 2021

Related U.S. Application Data

(63) Continuation of application No. 15/455,640, filed on Mar. 10, 2017, now Pat. No. 10,999,753, which is a continuation of application No. 14/313,871, filed on Jun. 24, 2014, now Pat. No. 9,603,040, which is a continuation of application No. 13/348,174, filed on Jan. 11, 2012, now Pat. No. 8,761,062.

(60) Provisional application No. 61/440,444, filed on Feb. 8, 2011, provisional application No. 61/432,275, filed on Jan. 13, 2011, provisional application No.
(Continued)

(51) Int. Cl.
*H04W 24/10* (2009.01)
*H04B 7/06* (2006.01)
*H04L 5/00* (2006.01)
*H04W 74/08* (2009.01)
*H04W 74/0833* (2024.01)

(52) U.S. Cl.
CPC .......... *H04W 24/10* (2013.01); *H04B 7/0632* (2013.01); *H04L 5/0057* (2013.01); *H04W 74/0841* (2013.01)

(58) Field of Classification Search
CPC .............. H04W 24/10; H04W 74/0841; H04B 7/0632; H04L 5/0057
See application file for complete search history.

(56) References Cited

U.S. PATENT DOCUMENTS 8,761,062 B2   6/2014  Chandrasekhar et al.
8,824,384 B2   9/2014  Nam et al.
(Continued)

OTHER PUBLICATIONS

Chen, et al., "Periodic CQI on PUCCH for Carrier Aggregation," CSI Payload on PUCCH, Texas Instruments, Aug. 17, 2010, 3 pages.
(Continued)

*Primary Examiner* — Omar J Ghowrwal
(74) *Attorney, Agent, or Firm* — Gregory J. Albin; Frank D. Cimino (57) ABSTRACT

A method and user equipment for channel state information (CSI) reporting are described. The method receives a channel quality indicator request. The method determines a channel quality indicator based on a CSI reference resource. The method transmits a CSI report that includes the channel quality indicator via a Physical Uplink Control CHannel (PUCCH) on an uplink subframe. The CSI reference resource belongs to a subframe subset for which the CSI report is sent. The CSI reference resource includes overhead of Demodulation Reference Signals according to a corresponding rank report.

18 Claims, 7 Drawing Sheets

Related U.S. Application Data

61/431,490, filed on Jan. 11, 2011, provisional application No. 61/431,655, filed on Jan. 11, 2011.

(56) References Cited

U.S. PATENT DOCUMENTS

| | | |
|---|---|---|
| 2010/0238824 A1 | 9/2010 | Farajidana et al. |
| 2010/0296472 A1 | 11/2010 | Lee et al. |
| 2011/0222485 A1 | 9/2011 | Nangia et al. |
| 2012/0082052 A1 | 4/2012 | Oteri et al. |
| 2012/0127869 A1 | 5/2012 | Yin et al. |
| 2012/0140708 A1 | 6/2012 | Choudhury et al. |
| 2012/0220286 A1 | 8/2012 | Chen et al. |
| 2014/0321306 A1 | 10/2014 | Nam et al. |
| 2015/0071238 A1 | 3/2015 | Seo et al. |
| 2016/0164589 A1 | 6/2016 | Han et al. |

OTHER PUBLICATIONS

"LTE; Evolved Universal Terrestrial Radio Access (E-UTRA); Physical Layer Procedures (3GPP TS 36.213 Version 9.3.0 Release 9)," ETSI TS 136 213, V.9.3.0, Technical Specification, 82 pages, 2010.

"3rd Generation Partnership Project; Technical Specification Group Radio Access Network; Evolved Universal Terrestrial Radio Access (E-UTRA); Physical Layer Procedures (Release 10)," 3GPP TS 36.213, V10.0.1, Technical Specification, 98 pages, 2010.

"The Mobile Broadband Standard," 3GPP Specification Detail, 3GPP TS 36.213, Evolved Universal Terrestrial Radio Access (E-UTRA); Physical Layer Procedures, Sep. 28, 2015, 3 pages.

"Specification of the Bluetooth System Experience More," Master Table of Contents & Compliance Requirements, Covered Core Package Version: 4.0, Current Master TOC, Bluetooth, Jun. 30, 2010, 38 pages.

"Uniersal Serial Bus 3.0 Specification," Universal Serial Bus 3.0 Specification, Revision 1.0, Nov. 12, 2008, 28 pages.

Duplex (telecommunications), Wikipedia, http://en.wikipedia.org/wiki/Duplex, Aug. 24, 2015, 5 pages.

"Hypertext Transfer Protocol," Wikipedia, http://en.wikipedia.org/wiki/hypertext_Transfer_Protocol, Aug. 24, 2015, 12 pages.

"Voice over IP," Wikipedia, http://en.wikipedia.org\wiki/voice_over_IP, Aug. 24, 2015, 19 pages.

LTE; Evolved Universal Terrestrial Radio Access (E-UTRA); Physical Layer Procedures (3GPP TS 36.213 Version 8.8.0 Release 8), ETSI TS 136 213 V.8.8.0 (Oct. 2009), 79 pages.

"Provisional Prosecution History," U.S. Appl. No. 61/374,334, filed Aug. 17, 2010, 15 pages.

"Prosecution History," U.S. Appl. No. 13/348,174, filed Jan. 11, 2012, 280 pages.

"Prosecution History," U.S. Appl. No. 14/313,871, filed Jun. 24, 2014, 424 pages.

"Prosecution History," U.S. Appl. No. 15/455,640, filed Mar. 10, 2017, 322 pages.

CSI REPORTING

CLAIM OF PRIORITY

This application is a continuation of U.S. application Ser. No. 15/455,640 filed Mar. 10, 2017, which is a continuation of U.S. application Ser. No. 14/313,871 filed Jun. 24, 2014, now U.S. Pat. No. 9,603,040 issued Mar. 21, 2017, which is a continuation of application Ser. No. 13/348,174 filed Jan. 11, 2012, now U.S. Pat. No. 8,761,062 B2 issued Jun. 24, 2014, which claims the benefit of U.S. Provisional Application No. 61/431,490 filed Jan. 11, 2011, U.S. Provisional Application No. 61/431,655 filed Jan. 11, 2011, U.S. Provisional Application No. 61/432,275 filed Jan. 13, 2011 and U.S. Provisional Application No. 61/440,444 filed Feb. 8, 2011.

TECHNICAL FIELD OF THE INVENTION

The technical field of this invention is wireless communication such as wireless telephony.

BACKGROUND OF THE INVENTION

The present embodiments relate to wireless communication systems and, more particularly, to the precoding of Physical Downlink Shared Channel (PDSCH) data and dedicated reference signals with codebook-based feedback for multi-input multi-output (MIMO) transmissions.

With Orthogonal Frequency Division Multiplexing (OFDM), multiple symbols are transmitted on multiple carriers that are spaced apart to provide orthogonality. An OFDM modulator typically takes data symbols into a serial-to-parallel converter, and the output of the serial-to-parallel converter is considered as frequency domain data symbols. The frequency domain tones at either edge of the band may be set to zero and are called guard tones. These guard tones allow the OFDM signal to fit into an appropriate spectral mask. Some of the frequency domain tones are set to values which will be known at the receiver. Among these are Cell-specific Channel State Information Reference Signals (CSI-RS) and Dedicated or Demodulation Reference Signals (DMRS). These reference signals are useful for channel estimation at the receiver. In a multi-input multi-output (MIMO) communication systems with multiple transmit/receive antennas, the data transmission is performed via precoding. Here, precoding refers to a linear (matrix) transformation of a L-stream data into P-stream where L denotes the number of layers (also termed the transmission rank) and P denotes the number of transmit antennas. With the use of dedicated (user-specific) DMRS, a transmitter (base station, also termed eNodeB or eNB can perform any precoding operation which is transparent to a user equipment (UE) which acts as a receiver. At the same time, it is beneficial for the base station to obtain a recommendation on the choice of precoding matrix from the user equipment. This is particularly the case for frequency-division duplexing (FDD) where the uplink and downlink channels occupy different parts of the frequency bands, i.e. the uplink and downlink are not reciprocal. Hence, a codebook-based feedback from the UE to the eNodeB is preferred. To enable a codebook-based feedback, a precoding codebook needs to be designed.

The Rel. 8 Long-Term Evolution (LTE) specification includes a codebook for 2-antenna transmissions and a codebook for 4-antenna transmissions. While those codebooks are designed efficiently, they do not support transmissions with 8 antennas. Moreover, it is possible to further improve the performance of 4-antenna transmissions under different scenarios such as dual-polarized antenna arrays.

While the preceding approaches provide steady improvements in wireless communications, the present inventors recognize that still further improvements in downlink (DL) spectral efficiency are possible. Accordingly, the preferred embodiments described below are directed toward these problems as well as improving upon the prior art.

SUMMARY OF THE INVENTION

This invention sets conditions for user equipment responses to channel state indicator request in channel station information that may conflict.

BRIEF DESCRIPTION OF THE DRAWINGS

These and other aspects of this invention are illustrated in the drawings, in which.

DETAILED DESCRIPTION OF PREFERRED EMBODIMENTS

Figure 1:
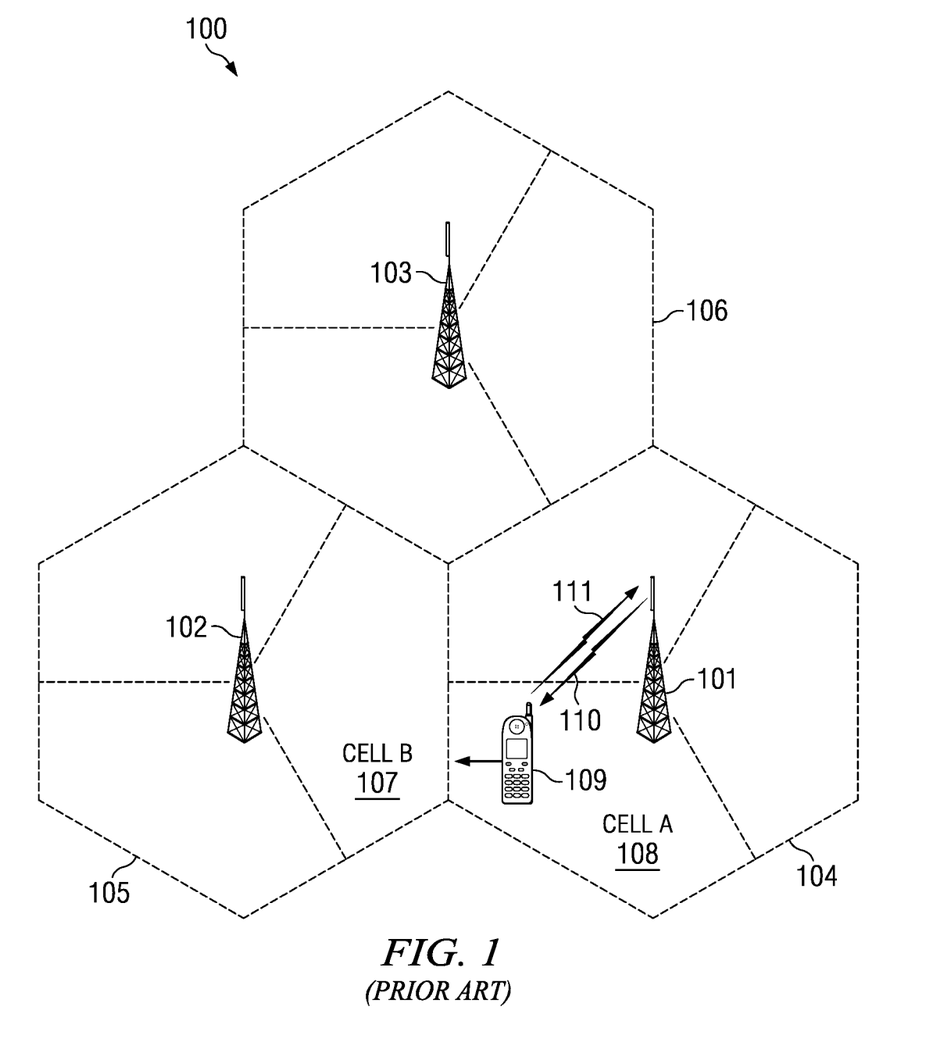
FIG. 1 illustrates an exemplary prior art wireless communication system to which this application is applicable.

FIG. 1 shows an exemplary wireless telecommunications network 100. The illustrative telecommunications network includes base stations 101, 102 and 103, though in operation, a telecommunications network necessarily includes many more base stations. Each of base stations 101, 102 and 103 (eNB) are operable over corresponding coverage areas 104, 105 and 106. Each base station's coverage area is further divided into cells. In the illustrated network, each base station's coverage area is divided into three cells. Handset or other user equipment (UE) 109 is shown in Cell A 108. Cell A 108 is within coverage area 104 of base station 101. Base station 101 transmits to and receives transmissions from UE 109. As UE 109 moves out of Cell A 108 and into Cell B 107, UE 109 may be handed over to base station 102. Because UE 109 is synchronized with base station 101, UE 109 can employ non-synchronized random access to initiate handover to base station 102.

Non-synchronized UE 109 also employs non-synchronous random access to request allocation of up-link 111 time or frequency or code resources. If UE 109 has data ready for transmission, which may be traffic data, measurements report, tracking area update, UE 109 can transmit a random access signal on up-link 111. The random access signal notifies base station 101 that UE 109 requires up-link resources to transmit the UEs data. Base station 101 responds by transmitting to UE 109 via down-link 110, a message containing the parameters of the resources allocated for UE 109 up-link transmission along with a possible timing error correction. After receiving the resource allocation and a possible timing advance message transmitted on down-link 110 by base station 101, UE 109 optionally adjusts its transmit timing and transmits the data on up-link 111 employing the allotted resources during the prescribed time interval.

Base station 101 configures UE 109 for periodic uplink sounding reference signal (SRS) transmission. Base station 101 estimates uplink channel quality information (CSI) from the SRS transmission.

Figure 2:
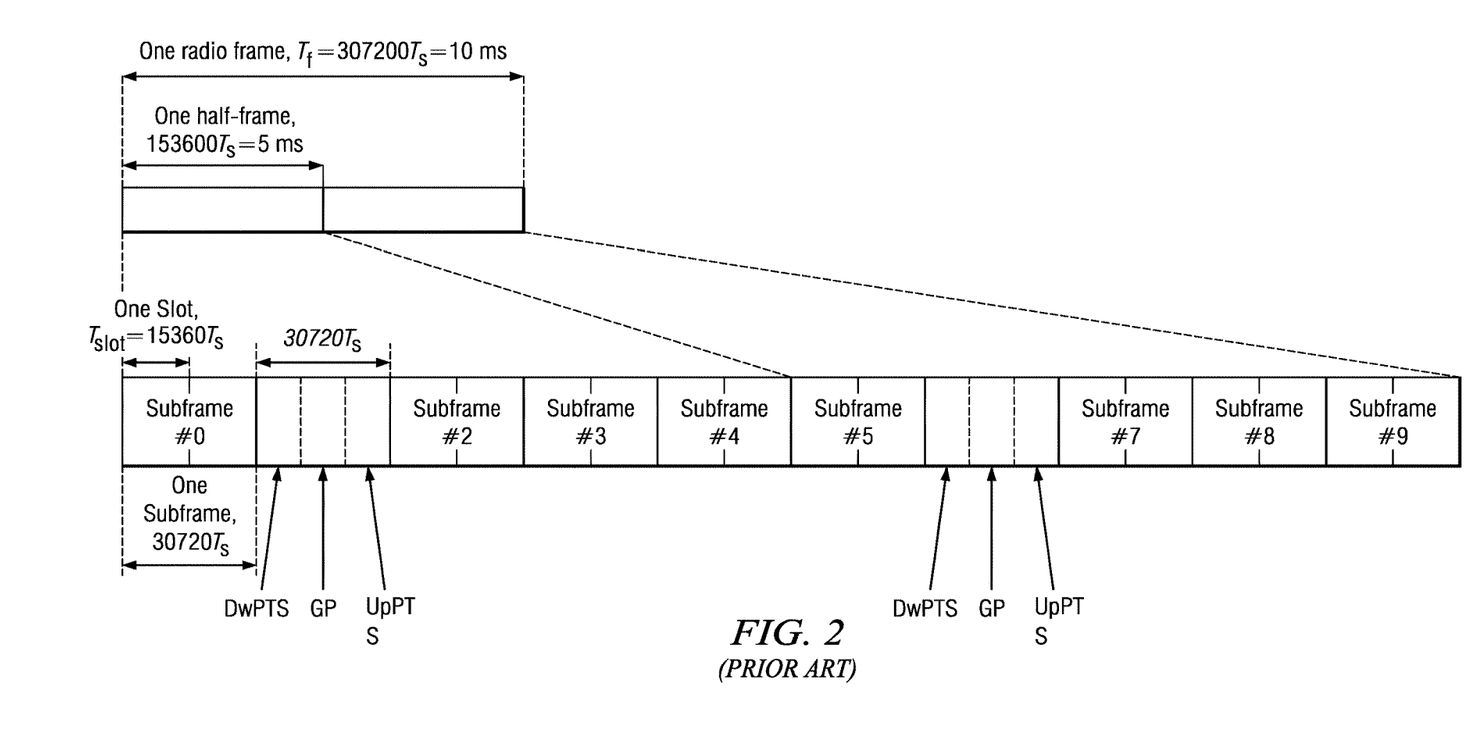
FIG. 2 shows the Evolved Universal Terrestrial Radio Access (E-UTRA) Time Division Duplex (TDD) frame structure of the prior art.

FIG. 2 shows the Evolved Universal Terrestrial Radio Access (E-UTRA) time division duplex (TDD) Frame Structure. Different subframes are allocated for downlink (DL) or uplink (UL) transmissions. Table 1 shows applicable DL/UL subframe allocations.

TABLE 1

| Configuration | Switch-point periodicity | Sub-frame number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 mS | D | S | U | U | U | D | S | U | U | U |
| 1 | 5 mS | D | S | U | U | D | D | S | U | U | D |
| 2 | 5 mS | D | S | U | D | D | D | S | U | D | D |
| 3 | 10 mS | D | S | U | U | U | D | D | D | D | D |
| 4 | 10 mS | D | S | U | U | D | D | D | D | D | D |
| 5 | 10 mS | D | S | U | D | D | D | D | D | D | D |
| 6 | 10 mS | D | S | U | U | U | D | S | U | U | D |

Introduction

Feedback is essential in wireless communication where a UE measures the downlink channels and reports the channel state information (CSI) to a base station. The CSI feedback is then used by the base station to perform downlink scheduling involving frequency assignment, user scheduling, modulation and coding scheme selection. UE measurement is performed on downlink reference symbols (RS). Two sets of RS are available in LTE: (1) CRS; and (2) CSI-RS.

In Rel. 8 and Rel. 9, CSI measurement is performed on cell-specific reference symbols (CRS). CRS is present in every subframe, every resource block and is not precoded. All transmission modes in Rel. 8 (transmission modes 1 to 8) belong to this category.

In Rel. 10, a new set of RS called CSI-RS is introduced for CSI measurement for UE configured in transmission mode 9 (TM-9). CSI-RS has lower time and frequency domain density than CRS. In the time domain, CSI-RS duty cycle takes values from {5, 10, 20, 50, 100 . . . }. Thus not every downlink subframe contains CSI-RS. The time domain relationship between subframes where CSI is defined and reported are carefully specified to ensure accuracy and testability of CSI report while leaving sufficient flexibility of propriety UE measurement implementation.

In a LTE-Advanced (Rel. 10) system, this invention solves the following problems:

This invention provides specific schemes for determining UE procedures during: a) Channel Quality Indicator (CQI) measurement in Rel. 10 transmission mode 9; and b) the choice of CQI reference resource in a UE configured for transmission mode 9.

This invention provides specific schemes for Channel state information (CSI) feedback reporting when a Rel. 10 (or higher) UE is configured with two sets of subframes on which to perform channel and interference measurements.

CQI Reference Resource in Transmission Mode 9

For Rel. 8 transmission modes 1 to 8 (TM-1 to TM-8) the cell-specific reference signal (CRS) is used for channel estimation purpose during link adaptation. It has been agreed that a Rel. 10 UE configured in transmission mode 9 (TM-9) shall use only cell-specific CSI-RS (1, 2, 4 or 8 CSI-RS ports) for channel estimation during link adaptation for all CSI feedback modes. This agreement does not require the UE to estimate interference in a particular way such as only using CSI-RS or only using CRS.

Unlike CRS, which occurs during each downlink subframe, the CSI-RS pilot has a lower duty cycle periodicity from the set {5, 10, 15, 20, 40, and 80} mS. Thus CSI-RS does not occur in each downlink subframe. Thus it is unclear whether or not the existing Rel. 8 definition of a CQI reference resource is adequate for CSI reporting in TM-9. This invention presents choices of CQI reference resource in a UE configured for TM-9.

CSI Feedback Using Two Subframe Subsets

Rel. 10 CSI feedback involves monitoring up to two Radio Resource Control (RRC) configured sets of subframes. The first subset indicates they are subject to a different level of interference than in the second subset. At least for aperiodic CSI reporting, the CSI feedback is based on the subset containing the CQI reference resource. This invention provides choices pertaining to: a) the selection of CQI reference resource during periodic CQI reporting for two subframe subsets; and b) collision handling when the periodic CSI reports for two subframe subsets are colliding in an uplink subframe.

CQI Reference Resource for CSI Reporting in Transmission Mode 9

If the CSI reference subframe must be a CSI-RS subframe, this invention makes the following proposal on CQI reference resource.

In a first embodiment the CQI reference resource is defined as follows. In the frequency domain, the CQI reference resource is defined by the group of downlink physical resource blocks corresponding to the band to which the derived CQI value relates. In the time domain, the CQI reference resource is defined by a single downlink subframe n-nCQI_ref, where for periodic CQI reporting nCQI_ref is the smallest value greater than or equal to 4 which is a valid downlink subframe. For a UE configured in TM-9, a valid downlink subframe must be a CSI-RS subframe.

Figure 3:
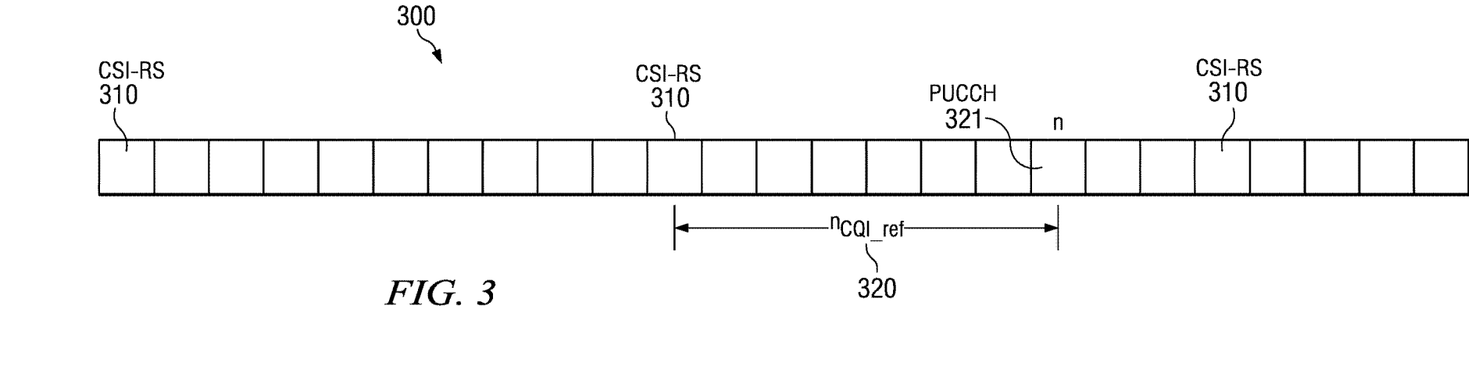
FIG. 3 illustrates plural subframes including periodic CSI-RS subframes where a PUCCH n subframe follows a last CSI-RS subframe by FIG. 4 illustrates plural subframes 400 periodic CSI-RS subframes 410 where following a CSI trigger coincident with one CSI-RS subframe, a PUSCH follows the last CSI-RS subframe by an interval $n_{CQI,ref}$.

This is illustrated in FIG. 3. FIG. 3 illustrates plural subframes 300 including periodic CSI-RS subframes 310. A Physical Uplink Control CHannel (PUCCH) n subframe 315 follows a last CSI-RS subframe 310 by an interval $n_{CQI\_ref}$ 320.

This invention also requires that for aperiodic CQI reporting nCQI_ref the reference resource is in the same valid downlink subframe as the corresponding CQI request in an uplink Downlink control information (DCI) format. Thus for a UE configured in TM-9, a valid downlink subframe is the same valid downlink subframe as the corresponding CQI request in an uplink DCI format if this is a CSI-RS subframe or it is the nearest CSI-RS subframe prior to the downlink subframe containing the CQI request in an uplink DCI format.

Figure 4:
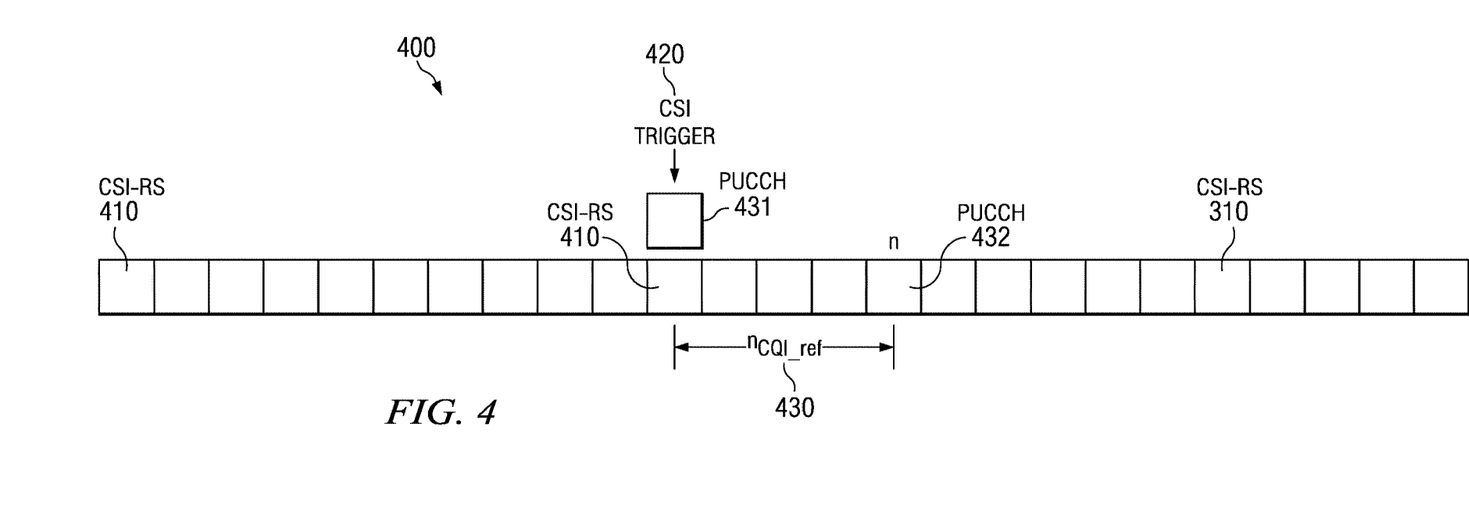
Figure 5:
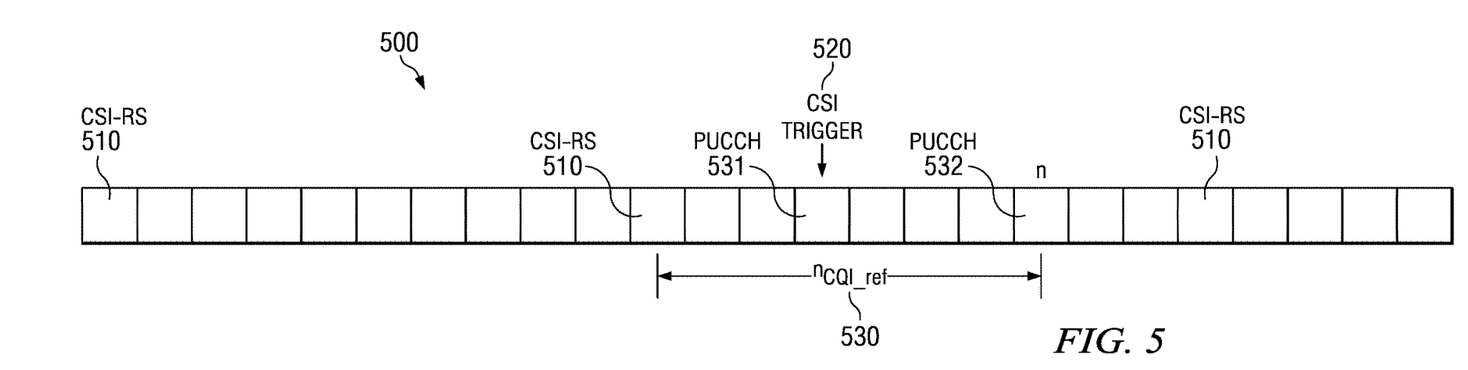
FIG. 5 illustrates plural subframes including periodic CSI-RS subframes where following a CSI trigger between CSI-RS subframes, a PUSCCH subframe follows the last CSI-RS subframe by an interval $n_{CQI,ref}$.

This is illustrated in respective FIGS. 4 and 5. FIG. 4 illustrates plural subframes 400 including periodic CSI-RS subframes 410. Following a CSI trigger 420 in PUCCH 431 containing an UL DCI format is coincident with one CSI-RS subframe 410. PUCCH subframe 432 follows the last CSI-RS subframe 410 by an interval $n_{CQI\_ref}$ 430. Similarly, FIG. 5 illustrates plural subframes 500 including periodic CSI-RS subframes 510. Following a CSI trigger 520 between CSI-RS subframes 510, conveyed in a PUCCH in subframe 531, a PUSCH in subframe 532 follows the last CSI-RS subframe 510 by an interval $n_{CQI\_ref}$ 530. Thus nCQI_ref is min{4, nCSI-RS} where nCSI-RS is the timing difference in subframes to the closest CSI-RS subframe no later than the subframe carrying CQI-triggering UL grant.

This invention also requires that for aperiodic CQI reporting nCQI_ref is equal to 4 and the downlink subframe n-nCQI_ref corresponds to a valid downlink subframe, where downlink subframe n-nCQI_ref is received after the subframe with the corresponding CQI request in a Random Access Response Grant. For a UE configured in TM-9, nCQI_ref is greater than or equal to 4 and downlink subframe n-nCQI_ref corresponds to a valid downlink subframe, which must be a CSI-RS subframe.

A downlink subframe is valid if: (1) it is configured as a downlink subframe for that UE; (2) except for transmission mode 9, it is not a Multimedia Broadcast multicast service Single Frequency Network (MBSFN) subframe; (3) it does not contain a DwPTS field in case the length of DwPTS is 7690 Ts or less; and (4) it does not fall within a configured measurement gap for that UE. If there is no valid downlink subframe for the CQI reference resource, CQI reporting is omitted in uplink subframe n.

UE Assumptions During CQI Measurement in Transmission Mode 9

In the CSI reference resource, the UE follows a set of assumptions for the purpose of deriving the CQI index given below. In the CQI reference resource, the UE shall assume the following for the purpose of deriving the CQI index: (1) the first 3 OFDM symbols are occupied by control signaling; (2) no resource elements are used by primary or secondary synchronization signals or Physical Broadcast CHannel (PBCH); (3) the CP length of the non-MBSFN subframes; (4) redundancy Version 0; (5) if CSI-RS is used for channel measurements, the ratio of Physical Downlink Shared CHannel (PDSCH) Energy Per Resource Element (EPRE) to CSI-RS EPRE is as given in Rel. 10 (6) the PDSCH transmission scheme depends on the transmission mode currently configured for the UE which may be the default mode; (7) if CRS is used for channel measurements, the ratio of PDSCH EPRE to cell-specific RS EPRE is as given in Red. 10 except that $\rho_A$ shall be assumed to be $\rho_A = P_A + \Delta_{offset} + 10 \log_{10}$ [dB] for any modulation scheme, if the UE is configured with transmission mode 2 with 4 cell-specific antenna ports, or transmission mode 3 with 4 cell-specific antenna ports and the associated RI is equal to one, and $\rho_A = P_A + \Delta_{offset}$ [dB] for any modulation scheme and any number of layers, otherwise. The shift $\Delta_{offset}$ is given by the parameter nom PDSCH-RS-EPRE-Offset which is configured by higher-layer signaling.

In deriving the CQI index, the appropriate overhead should be taken into account so that the CQI index, equivalently the maximum supportable TBS, can be received with 10% Block Error Rate (BLER). Usually, a conservative CSI report is preferable than an optimistic CSI because the later may lead to overly aggressive link adaptation and a failed DL transmission such as 3 OFDM symbols are always assumed for CQI report.

In the current Rel. 8/9 CQI definition it is unclear if the DMRS overhead shall be assumed in deriving the CQI index for TM-9. If not, the effective code rate for DL PDSCH transmission may be substantially higher than that in the CQI report due to the non-trivial DMRS overhead. This reduces the CQI accuracy and deteriorates link adaptation accuracy.

In a second embodiment, for a UE configured in TM-9, when deriving the CQI reference index the UE shall assume the appropriate DMRS overhead associated with the corresponding rank report. This such as 12 Resource Elements (RE) for 1 or 2 layers, 24 RE for 3 to 8 layers for normal CP. This is to ensure that the CSI report is not overly optimistic.

Similarly, if the CQI reference resource falls in a CSI-RS subframe, it is desirable that the CSI-RS overhead in terms of the resource elements occupied in the subframe containing the CQI reference resource is accounted for, while deriving the CQI report.

In a third embodiment, if a CSI reference subframe is a CSI-RS subframe with respect to PDSCH muting, the UE assumes the presence of CSI-RS in the CSI reference subframe for the purpose of deriving the CQI index.

CQI Reference Resource for Periodic CSI Reporting

Figure 6:
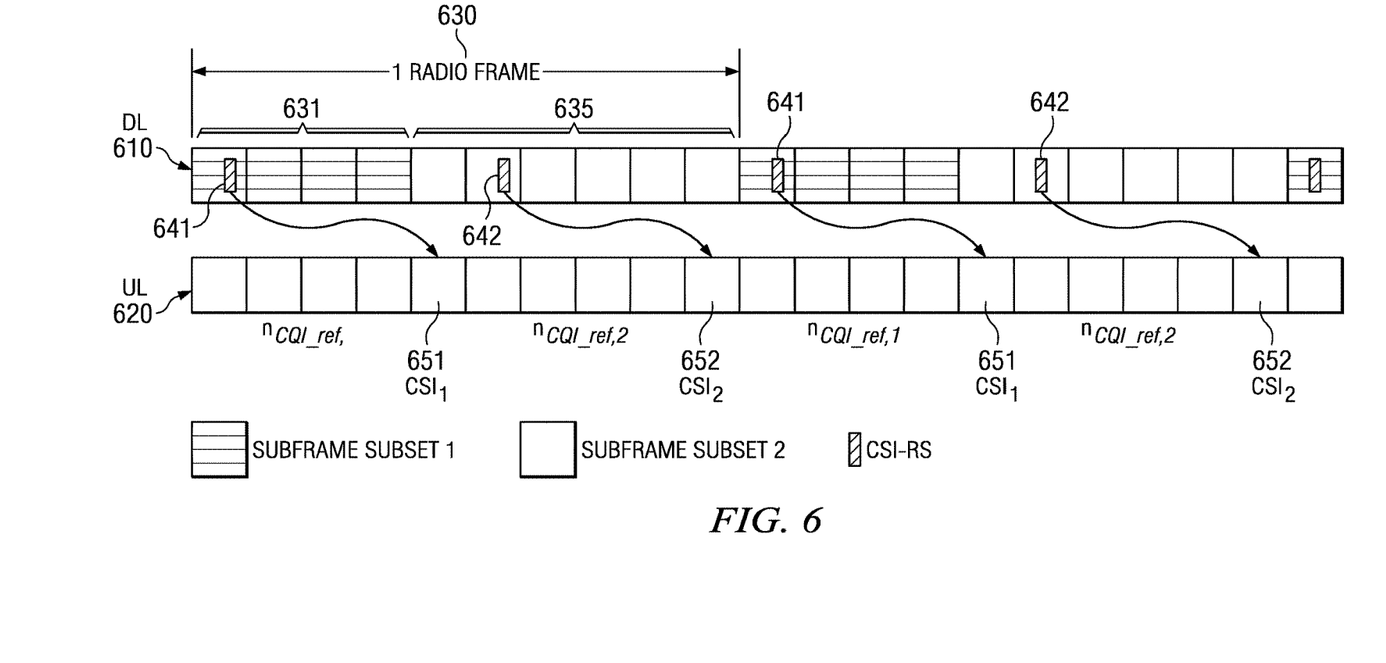
FIG. 6 illustrates an embodiment for the case when two CSI reports are configured in parallel where each CSI-RS subframe in a first subset of subframes triggers a corresponding $CSI_1$ report $n_{CQI\_ref,1}$ subframes later and each CSI-RS subframe in a second subset of subframes triggers a corresponding $CSI_2$ report $n_{CQI\_ref,2}$ subframes later.

This invention provides the following when either two subframe subsets or zero subframe subsets are configured for periodic CSI reporting at the UE. In a fourth embodiment, if two subframe subsets are configured the CQI reference resource for periodic CSI reporting is chosen in the most recent valid DL subframe $n-n_{CQI\_ref}$, $n_{CQI\_ref} \geq 4$ which belongs to the subframe subset(s) for which CSI report is sent at n. FIG. 6 illustrates this embodiment for the case when two CSI reports are configured in parallel. FIG. 6 illustrates downlink subframes 610 and uplink subframes 620. Downlink subframes 610 are divided into radio frames 630 including a first subframe subset 631 and a second subframe subset 635. Each CSI-RS subframe 641 in downlink subframes 610 triggers a corresponding $CSI_1$ report in subframe 651 $n_{CQI\_ref,1}$ subframes later in uplink subframes 620. Each CSI-RS subframe 642 in downlink subframes 610 triggers a corresponding $CSI_2$ report in subframe 652 $n_{CQI\_ref,2}$ subframes later in uplink subframes 620.

For transmission mode 9, if two subframe subsets are configured for periodic CSI reporting and the CQI reference resource has to lie in a CSI-RS subframe, then in a fifth embodiment, if that the CQI reference resource for TM-9 has to lie in a CSI-RS subframe, then the CQI reference resource for periodic CSI reporting is chosen in the most recent valid CSI-RS downlink subframe $n-n_{CQI\_ref}$, $n_{CQI\_ref} \geq 4$ which belongs to the subframe subset(s) for which CSI report is sent at n.

If only a single periodic CSI report (zero subframe subsets) can be configured without any additional restrictions on the CQI reference resource other than those defined in Rel. 8/9, then the following sixth embodiment applies. In this sixth embodiment, the CQI reference resource for periodic CSI reporting is chosen in the most recent valid DL subframe n-n$_{CQI\_ref}$, n$_{CQI\_ref}$≥4 which belongs to the subframe subset (s) for which CSI report is sent at n.

For transmission mode 9, if only a single periodic CSI report (no subframe subsets) can be configured and the CQI reference resource has to lie in a CSI-RS carrying downlink subframe, then a seventh embodiment applies. In this seventh embodiment, the CQI reference resource for periodic CSI reporting is chosen in the most recent valid CSI-RS downlink subframe n-n$_{CQI\_ref}$, n$_{CQI\_ref}$≥4 which belongs to the subframe subset(s) for which CSI report is sent at n.

For transmission mode 9, if it is mandatory that the CQI reference resource is adopted to be the nearest CSI-RS carrying DL subframe, then the first embodiment applies.

TABLE 2

| Selection of CQI reference resource for TM-1 through TM-9 | Zero subframe subset (unrestricted CSI measurements) | Two subframe subsets (restricted subframes for CSI measurements) |
|---|---|---|
| Can be in non CSI-RS subframe | Sixth embodiment | Fourth embodiment |
| Only in CSI-RS subframe for TM-9 | Seventh embodiment | Fifth embodiment |

Single Periodic CSI Report with Two Subframe Subsets

If the is single periodic CSI reporting corresponding subframe subset determined by RRC linkage, the CSI report for the other subset is obtained via either aperiodic CSI request or RRC re-configuration with associated latency. At least for cell-edge UEs belonging to the victim cell, a single CSI report corresponding to protected subframe set may suffice. For cell-center UEs belonging to a victim cell, having two periodic reports is likely beneficial. The relative benefits are unclear from a system perspective.

With just a single CSI reporting configuration (single I$_{CQI/PMI}$), the eNodeB as well as the UE can always report CSI as long as they share a common understanding of the CQI reference resource. Consequently there is no reporting collision. On the other hand with two separate CSI reporting configurations, there could be colliding CSI which may require additional specification effort.

With two confirmed subframe subsets for restricted CSI reporting at the UE, a single CSI reporting configuration of offset and periodicity given by the parameters I$_{CQI/PMI}$ and I$_{RI}$ is chosen.

In a ninth embodiment, both UE and eNodeB are aware of the subframe subset for which the report is intended. This could be a CSI report sent based on restricted CSI measurements based either only on subset 1, or based only on subset 2. The only question that arises is how the CQI reference resource is chosen. In this ninth embodiment, the UE reports CSI corresponding to the subset to which the CQI reference resource belongs to given by the following: sub-claims. In this ninth embodiment the CQI reference resource for periodic CSI reporting is chosen in the most recent valid DL subframe n-n$_{CQI\_ref}$, n$_{CQI\_ref}$≥4 belonging to the subframe subset linked to the CSI report at n. Alternatively, if the CQI reference resource for TM-9 has to lie in a CSI-RS subframe, then the CQI reference resource for periodic CSI reporting is chosen in the most recent valid CSI-RS downlink subframe n-n$_{CQI\_ref}$, n$_{CQI\_ref}$≥4 belonging to the subframe subset linked to the CSI report at n. Thus this embodiment potentially involves shifting the time-domain CQI resource such that it falls in the appropriate subframe subset linked to the CSI reporting.

In the tenth embodiment there is only one CSI reporting configuration, but the subset for which CSI reporting is conducted can be based on either subset 1 or subset 2. Thus there can be multiple ongoing CSI reports which are multiplexed in time across different CSI reporting instances. With two configured subframe subsets for restricted CSI measurements at the UE, a single periodic CSI reporting configuration including offset and periodicity given by the parameters ICQI/PMI and IRI is chosen. The CSI report is transmitted according to the following rules. First, the CQI reference resource for the periodic CSI report at n is chosen in the most recent valid DL subframe n−n$_{CQI\_ref}$, n$_{CQI\_ref}$≥4. Second, the CSI report is transmitted corresponding to the subframe subset containing the CQI reference resource. If the CQI reference resource does not lie in either subframe subset, then the periodic CSI report at subframe n is dropped or the periodic CSI report at subframe n is transmitted according to a pre-specified subset priority.

In the tenth embodiment, the CSI report at any given PUCCH reporting instance is based on restricted CSI measurements corresponding to either subset 1 or subset 2.

An eleventh embodiment includes a combination of fourth and eight embodiments. Periodic CSI reporting can occur according to either of the following possibilities. First, according to the fourth or fifth embodiments with two CSI reporting configurations of subframe offset and duty cycle periodicity. Second, according to the tenth or eleventh embodiments with only one CSI reporting configuration there is a single value of the subframe offset and duty cycle periodicity.

Schemes for Collision Handling with Two CSI Reports

If two on-going periodic CSI feedback reports are used, ideally the eNodeB selects the CSI reporting offset N$_{OFFSET, CQI}$ and duty cycle periodicities N$_P$ mapped by the higher-layer parameter I$_{CQI/PMI}$ so that collisions do not occur during reporting. The CQI reference resource is accordingly determined from fifth embodiment. If this is not the case, there could be a PUCCH reporting subframe n which corresponds to a periodic CSI feedback subframe for both subframe subsets. This invention includes the following alternatives for collision-handling. In a twelfth embodiment, a periodic CSI report at uplink subframe n is omitted. In a thirteenth embodiment, both periodic CSI reports corresponding to respective subframe subsets are transmitted at uplink subframe n. A fourteenth embodiment establishes relative priority during RRC linkage between the CSI feedback and each configured subset among subframe subsets to determine the reporting subset at uplink subframe n. In a fifteenth embodiment, CQI reference resource for periodic CSI feedback at uplink subframe n is intended for the subframe subset L of 1 or 2 whose CQI reference resource lies closer to n. This is $$L = a\ rmg\ nic_{n_{Q,r}\ le,lj}\atop l\in\{1,2\}}$$

implying that CSI feedback is more accurate.

Figure 7:
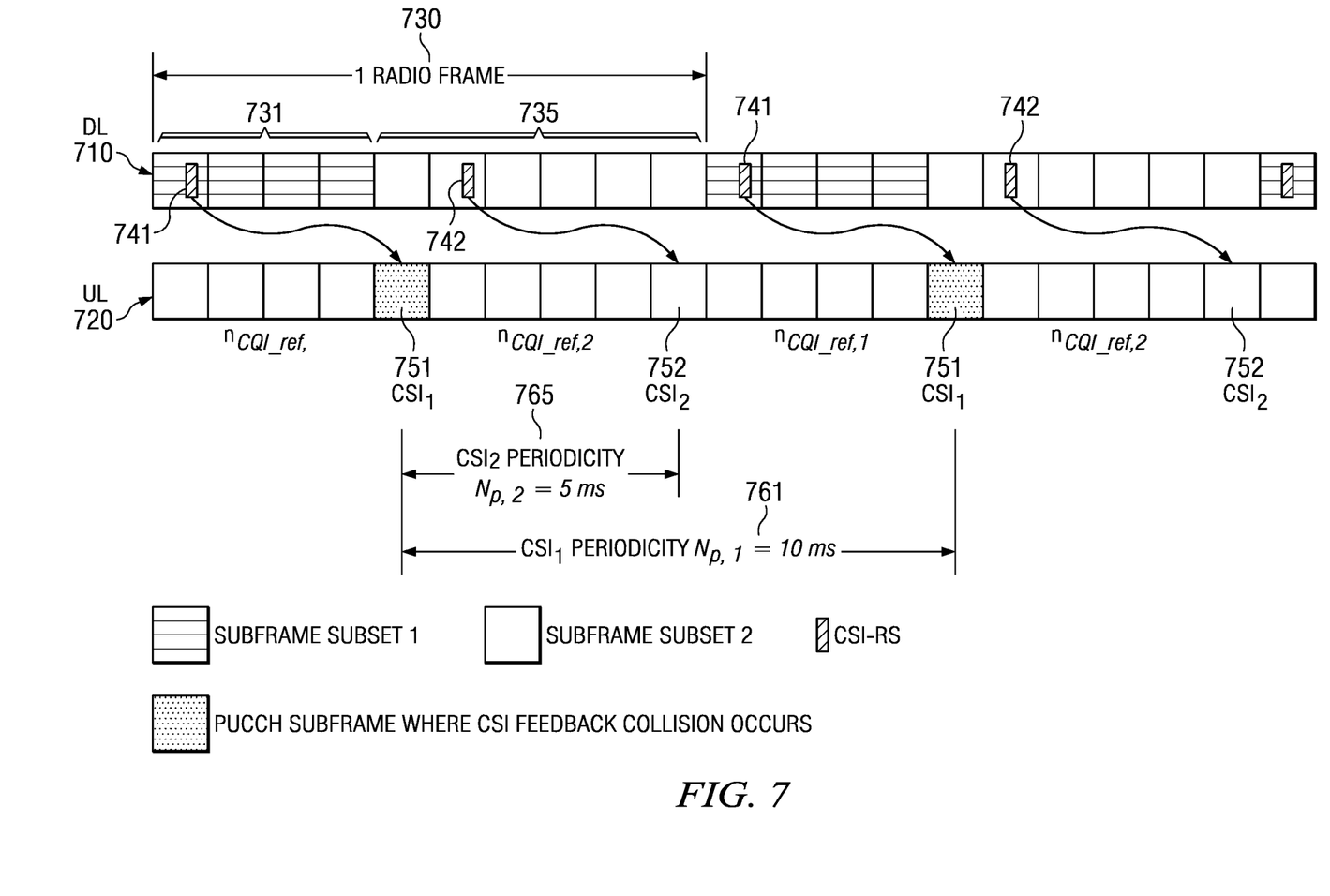
FIG. 7 shows is similar to FIG. 6 where the periodic CSI feedback reporting periodicity for subframes from the first subset differs from that of the second subframe subset and subframes from the second subset are always dropped for colliding subframes.

The CQI reference resource definition in Rel. 8 may be revised for TM-9 so that the CQI reference subframe lies in a CSI-RS carrying DL subframe. In this case, CSI feedback for each subframe subset have different CQI reference subframe. Thus CSI feedback with reference subframe n$_{CQI\_ref,l}$≥4 closer to reporting instance n possesses higher accuracy. The CSI report corresponding to the subframe subset with lower accuracy known as an older CQI reference resource is dropped. FIG. 7 shows illustrates downlink subframes 710 and uplink subframes 720. Downlink subframes 710 are divided into radio frames 730 including a first subframe subset 731 and a second subframe subset 735. Each CSI-RS subframe 741 in downlink subframes 710 triggers a corresponding $CSI_1$ subframe 751 $n_{CQI\_ref,1}$ subframes later in uplink subframes 720. Each CSI-RS subframe 742 in downlink subframes 710 triggers a corresponding $CSI_2$ subframe 752 $n_{CQI\_ref,2}$ subframes later in uplink subframes 720. In FIG. 7 subframe subset 1 731 has a periodic CSI feedback reporting periodicity 761 of 10 mS and subframe subset 2 735 has a periodic CSI feedback reporting periodicity 765 of 5 mS. During both collision instances illustrated in FIG. 7, subset 1 has a more recent CQI reference resource DL subframe 710. In this particular example therefore, CSI feedback for subframe subset 2 735 is always dropped during colliding subframes. In a sixteenth embodiment, CSI feedback in subframe n is intended for the subframe subset L of 1 or 2 whose CQI reference resource in time domain is further away from subframe n $$L = a \, rmg \, ni_C x_{Q,r \, Ie,ij}.$$
$$l=1,2$$

The subframe subset for which CSI feedback has a lower accuracy is reported to avoid overly inaccurate CSI feedback.

Figure 8:
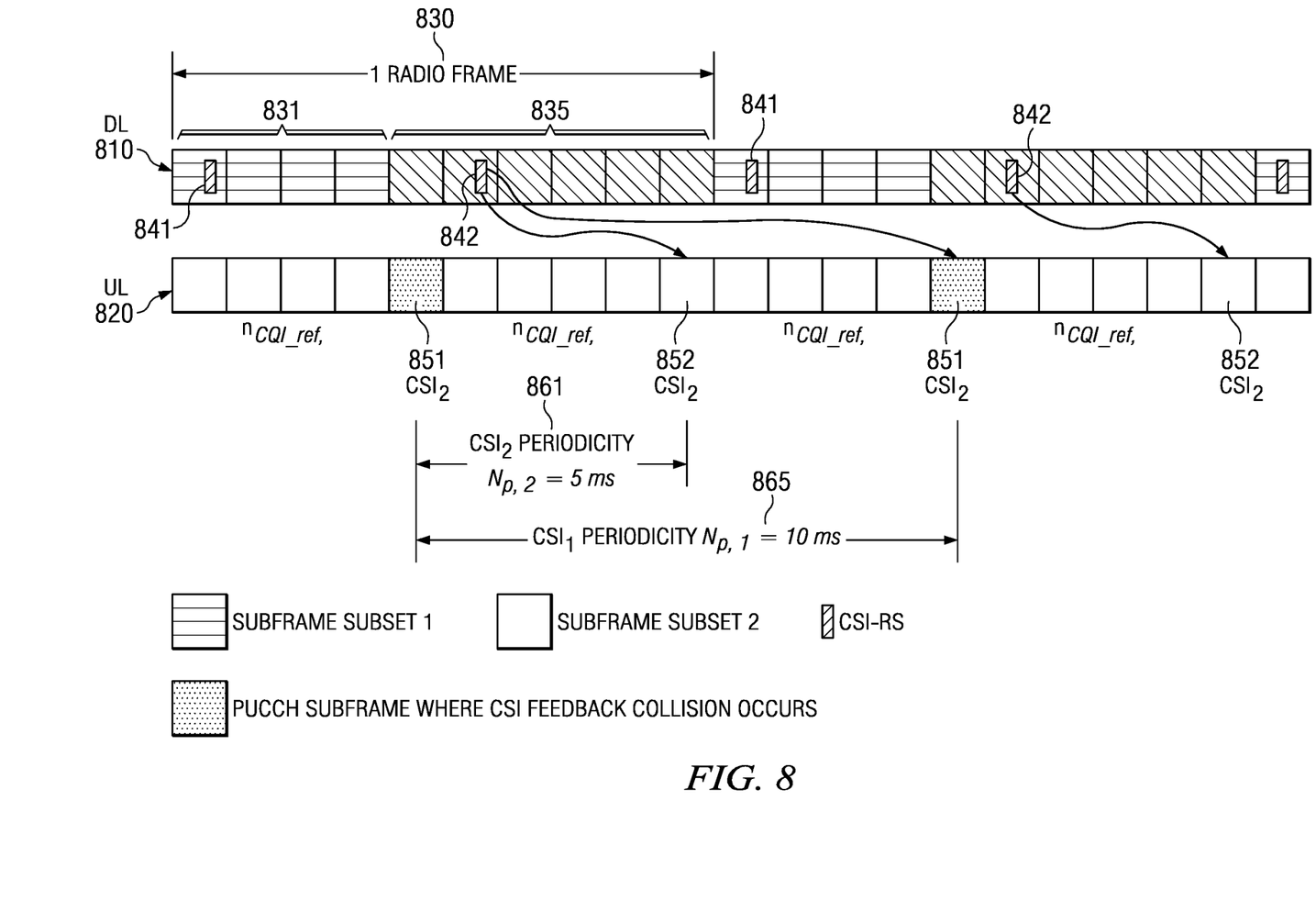
FIG. 8 shows is similar to FIG. 6 where the periodic CSI feedback reporting periodicity for subframes from the first subset differs from that of the second subframe subset and subframes from the first subset are always dropped for colliding subframes resulting in no transmission of subframes of the first subset 1.

FIG. 8 illustrates downlink subframes 810 and uplink subframes 820. Downlink subframes 810 are divided into radio frames 830 including a first subframe subset 831 and a second subframe subset 835. Each CSI-RS subframe 841 in downlink subframes 810 triggers a corresponding $CSI_1$ report in subframe 851 $n_{CQI\_ref,1}$ subframes later in uplink subframes 820. Each CSI-RS subframe 842 in downlink subframes 810 triggers a corresponding $CSI_2$ report in subframe 852 $n_{CQI\_ref,2}$ subframes later in uplink subframes 820. In FIG. 8 subframe subset 1 831 has a periodic CSI feedback reporting periodicity 861 of 10 mS and subframe subset 2 835 has a periodic CSI feedback reporting periodicity 865 of 5 mS. During both collision instances illustrated in FIG. 8, subset 2 has an older CQI reference resource DL subframe 810. In this particular pathological example, CSI feedback for subframe subset 1 is never transmitted. In a seventeenth embodiment, in case of collisions between two CSI reports during periodic CSI reporting: first, when both subsets report the same type of CSI report in a certain uplink subframe, the twelfth and the sixteenth embodiments apply; and second, when both subsets report different CSI reporting types such as rank indicator (RI)/wide-band CQI/sub-band CQI, the subframe subset is first chosen according to the relative priority as in Rel. 8/9 with RI≥CQI≥sub-band CQI. If subframe subset 1 is configured to report RI in a certain uplink subframe and subset 2 is configured to report CQI in the same uplink subframe, subframe subset 1 is given priority.

Aperiodic CSI Reporting with Restricted Measurements

In an eighteenth embodiment during aperiodic CSI reporting during uplink subframe n, if the CQI reference resource does not belong to either subset 1 or subset 2, the aperiodic CSI report at n is dropped.

Suppose an aperiodic CSI request is received and the CQI reference resource belongs to both subframe subsets 1 and 2. In a nineteenth embodiment during aperiodic CSI reporting during uplink subframe n, if the CQI reference resource belongs to both subframe subset 1 and subset 2, the aperiodic CSI report at n is transmitted for subframe subset 1 only. In a twentieth embodiment during aperiodic CSI reporting during uplink subframe n, if the CQI reference resource belongs to both subframe subset 1 and subset 2, the aperiodic CSI report at n is dropped.

Figure 9:
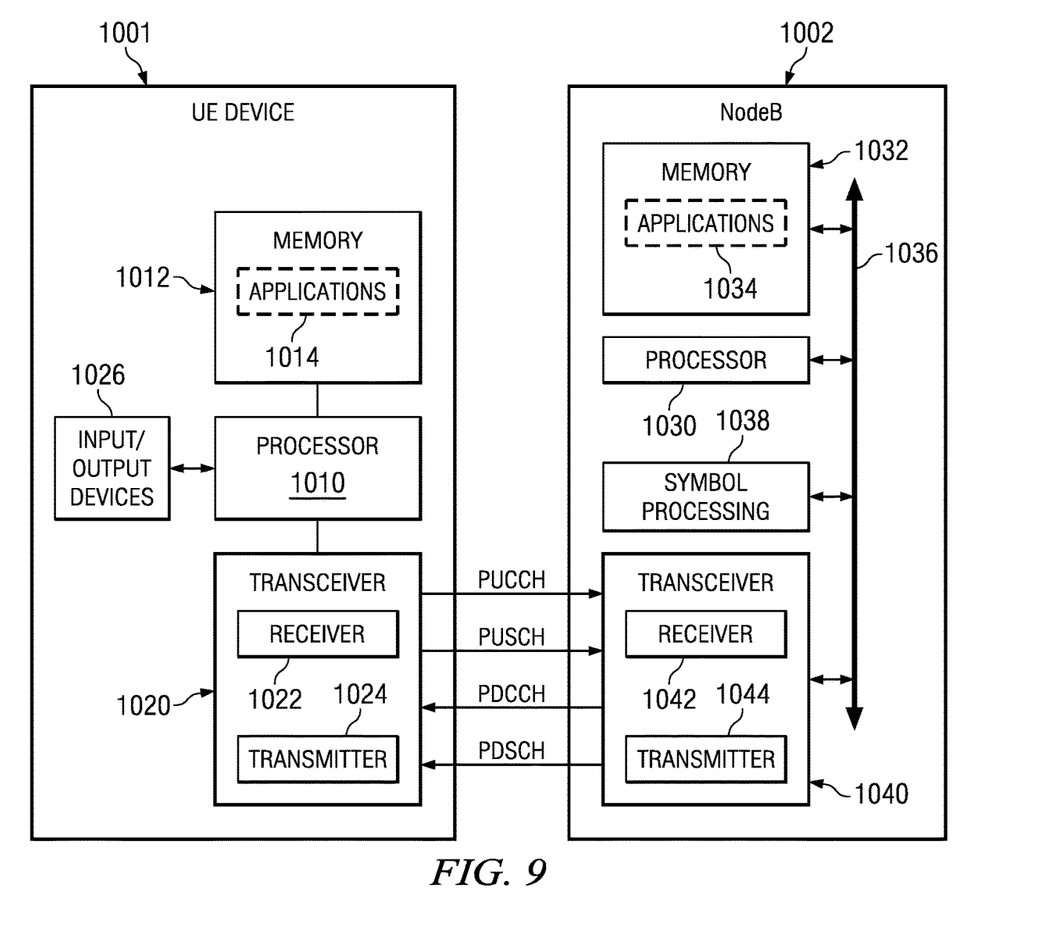
FIG. 9 is a block diagram illustrating internal details of a base station and a mobile user equipment in the network system of FIG. 1 suitable for implementing this invention.

FIG. 9 is a block diagram illustrating internal details of an eNB 1002 and a mobile UE 1001 in the network system of FIG. 1. Mobile UE 1001 may represent any of a variety of devices such as a server, a desktop computer, a laptop computer, a cellular phone, a Personal Digital Assistant (PDA), a smart phone or other electronic devices. In some embodiments, the electronic mobile UE 1001 communicates with eNB 1002 based on a LTE or Evolved Universal Terrestrial Radio Access Network (E-UTRAN) protocol. Alternatively, another communication protocol now known or later developed can be used.

Mobile UE 1001 comprises a processor 1010 coupled to a memory 1012 and a transceiver 1020. The memory 1012 stores (software) applications 1014 for execution by the processor 1010. The applications could comprise any known or future application useful for individuals or organizations. These applications could be categorized as operating systems (OS), device drivers, databases, multimedia tools, presentation tools, Internet browsers, emailers, Voice-Over-Internet Protocol (VOIP) tools, file browsers, firewalls, instant messaging, finance tools, games, word processors or other categories. Regardless of the exact nature of the applications, at least some of the applications may direct the mobile UE 1001 to transmit UL signals to eNB (base-station) 1002 periodically or continuously via the transceiver 1020. In at least some embodiments, the mobile UE 1001 identifies a Quality of Service (QoS) requirement when requesting an uplink resource from eNB 1002. In some cases, the QoS requirement may be implicitly derived by eNB 1002 from the type of traffic supported by the mobile UE 1001. As an example, VOIP and gaming applications often involve low-latency uplink (UL) transmissions while High Throughput (HTP)/Hypertext Transmission Protocol (HTTP) traffic can involve high-latency uplink transmissions.

Transceiver 1020 includes uplink logic which may be implemented by execution of instructions that control the operation of the transceiver. Some of these instructions may be stored in memory 1012 and executed when needed by processor 1010. As would be understood by one of skill in the art, the components of the uplink logic may involve the physical (PHY) layer and/or the Media Access Control (MAC) layer of the transceiver 1020. Transceiver 1020 includes one or more receivers 1022 and one or more transmitters 1024.

Processor 1010 may send or receive data to various input/output devices 1026. A subscriber identity module (SIM) card stores and retrieves information used for making calls via the cellular system. A Bluetooth baseband unit may be provided for wireless connection to a microphone and headset for sending and receiving voice data. Processor 1010 may send information to a display unit for interaction with a user of mobile UE 1001 during a call process. The display may also display pictures received from the network, from a local camera, or from other sources such as a Universal Serial Bus (USB) connector. Processor 1010 may also send a video stream to the display that is received from various sources such as the cellular network via RF transceiver 1020 or the camera.

During transmission and reception of voice data or other application data, transmitter 1024 may be or become non-synchronized with its serving eNB. In this case, it sends a random access signal. As part of this procedure, it determines a preferred size for the next data transmission, referred to as a message, by using a power threshold value provided by the serving eNB, as described in more detail above. In this embodiment, the message preferred size determination is embodied by executing instructions stored in memory 1012 by processor 1010. In other embodiments, the message size determination may be embodied by a separate processor/memory unit, by a hardwired state machine, or by other types of control logic, for example.

eNB 1002 comprises a Processor 1030 coupled to a memory 1032, symbol processing circuitry 1038, and a transceiver 1040 via backplane bus 1036. The memory stores applications 1034 for execution by processor 1030. The applications could comprise any known or future application useful for managing wireless communications. At least some of the applications 1034 may direct eNB 1002 to manage transmissions to or from mobile UE 1001.

Transceiver 1040 comprises an uplink Resource Manager, which enables eNB 1002 to selectively allocate uplink Physical Uplink Shared CHannel (PUSCH) resources to mobile UE 1001. As would be understood by one of skill in the art, the components of the uplink resource manager may involve the physical (PHY) layer and/or the Media Access Control (MAC) layer of the transceiver 1040. Transceiver 1040 includes at least one receiver 1042 for receiving transmissions from various UEs within range of eNB 1002 and at least one transmitter 1044 for transmitting data and control information to the various UEs within range of eNB 1002.

The uplink resource manager executes instructions that control the operation of transceiver 1040. Some of these instructions may be located in memory 1032 and executed when needed on processor 1030. The resource manager controls the transmission resources allocated to each UE 1001 served by eNB 1002 and broadcasts control information via the PDCCH.

Symbol processing circuitry 1038 performs demodulation using known techniques. Random access signals are demodulated in symbol processing circuitry 1038.

During transmission and reception of voice data or other application data, receiver 1042 may receive a random access signal from a UE 1001. The random access signal is encoded to request a message size that is preferred by UE 1001. UE 1001 determines the preferred message size by using a message threshold provided by eNB 1002. In this embodiment, the message threshold calculation is embodied by executing instructions stored in memory 1032 by processor 1030. In other embodiments, the threshold calculation may be embodied by a separate processor/memory unit, by a hardwired state machine, or by other types of control logic, for example. Alternatively, in some networks the message threshold is a fixed value that may be stored in memory 1032, for example. In response to receiving the message size request, eNB 1002 schedules an appropriate set of resources and notifies UE 1001 with a resource grant.

What is claimed is:

1. A method comprising:
   receiving a channel quality indicator request;
   determining a channel quality indicator based on a channel state information (CSI) reference resource; and
   transmitting a CSI report that includes the channel quality indicator via a Physical Uplink Control CHannel (PUCCH) on an uplink subframe, wherein the CSI reference resource belongs to a subframe subset for which the CSI report is sent, and wherein the CSI reference resource includes overhead of Demodulation Reference Signals according to a corresponding rank report.

2. The method of claim 1, wherein:
   a step of transmitting a channel quality indicator request is periodic with each transmission occurring on a subframe having a smallest value nCQI_ref greater than or equal to 4 that corresponds to a valid downlink subframe.

3. The method of claim 2, wherein:
   a valid downlink subframe is a subframe configured as a downlink subframe at a user equipment.

4. The method of claim 2, wherein:
   a valid downlink subframe is not a Multimedia Broadcast multicast service Single Frequency Network subframe.

5. The method of claim 2, further comprising:
   not transmitting a channel quality indicator request if there is no valid downlink subframe.

6. The method of claim 1, wherein:
   a step of transmitting a channel quality indicator request is aperiodic with each transmission occurring on a same subframe as a corresponding channel quality indicator request in an uplink Downlink Control Information format.

7. The method of claim 1, wherein:
   a step of transmitting a channel quality indicator request is aperiodic with each transmission occurring on a next valid downlink subframe following the channel quality indicator request that is a Random Access Response Grant subframe.

8. The method of claim 1, wherein:
   a user equipment is configured in transmission mode 9.

9. The method of claim 1, wherein:
   if a channel quality indicator reference index is a Cell-specific Channel State Information Reference Signal subframe the user equipment assumes the presence of Cell-specific Channel State Information Reference Signals in determining a channel quality indicator index.

10. The method of claim 1, wherein:
    each radio frame is divided into a first set of subframes and a second set of subframes;
    a step of transmitting a channel quality indicator request is periodic with a first periodicity for transmissions in said first set of subframes and a second periodicity for transmissions in said second set of subframes.

11. The method of claim 10, wherein:
    a channel quality indicator reference index must be a Cell-specific Channel State Information Reference Signal subframe; and
    if said first periodicity and said second periodicity causes conflict in transmitting a channel quality indicator response from a user equipment, the user equipment selects for periodic Channel State Information reporting a most recent valid Cell-specific Channel State Information Reference Signal subframe $n-n_{CQI\_ref}$, $n_{CQI\_ref} \geq 4$ which belongs to a subframe subset for which Channel State Information report is sent at n.

12. The method of claim 10, wherein:
    if said first periodicity and said second periodicity causes conflict in transmitting a channel quality indicator response from a user equipment, the user equipment selects a single Channel State Information reporting configuration of a predetermined offset and a predetermined periodicity.

13. The method of claim 10, wherein:
    if said first periodicity and said second periodicity causes conflict in transmitting a channel quality indicator response from a user equipment, the user equipment transmits neither channel quality indicator response.

14. The method of claim 10, wherein:
if said first periodicity and said second periodicity causes conflict in transmitting a channel quality indicator response from a user equipment, the user equipment transmits both channel quality indicator responses in a same uplink subframe.

15. The method of claim 10, further comprising:
transmitting via Radio Resource Control from the base station a predetermined priority between said first set of subframes and said second set of subframes;
if said first periodicity and said second periodicity causes conflict in transmitting a channel quality indicator response from a user equipment, the user equipment transmits a response to the channel quality indicator request corresponding to a priority set of subframes.

16. The method of claim 10, wherein:
if said first periodicity and said second periodicity causes conflict in transmitting a channel quality indicator response from a user equipment, the user equipment transmits a response to the channel quality indicator request lying closer to n where $$L = \underset{l=1,2}{\operatorname{argmax}} \, n_{CQI\_ref,l}.$$

17. The method of claim 10, wherein:
if said first periodicity and said second periodicity causes conflict in transmitting a channel quality indicator response from a user equipment, the user equipment transmits a response to the channel quality indicator request lying further from n where $$L = \underset{l=1,2}{\operatorname{argmax}} \, n_{CQI\_ref,l}.$$

18. A user equipment comprising:
a transceiver configured to receive a channel quality indicator request; and
a processor configured to determine a channel quality indicator based on a channel state information (CSI) reference resource,
wherein the transceiver is configured to transmit a CSI report that includes the channel quality indicator via a Physical Uplink Control CHannel (PUCCH) on an uplink subframe, wherein the CSI reference resource belongs to a subframe subset for which the CSI report is sent, and wherein the CSI reference resource includes overhead of Demodulation Reference Signals according to a corresponding rank report.

* * * * *